July 6, 1937.  G. B. LINDERMAN, JR  2,086,425
INTEGRATING APPARATUS
Original Filed June 30, 1931   6 Sheets-Sheet 1

Inventor
Garrett B. Linderman Jr.

By Strauch & Hoffman
Attorneys

July 6, 1937. G. B. LINDERMAN, JR 2,086,425
INTEGRATING APPARATUS
Original Filed June 30, 1931 6 Sheets-Sheet 2

Inventor
Garrett B. Linderman Jr.

By Strauch & Hoffman
Attorneys

July 6, 1937.  G. B. LINDERMAN, JR  2,086,425
INTEGRATING APPARATUS
Original Filed June 30, 1931   6 Sheets-Sheet 6

Inventor
Garrett B. Linderman Jr.

Strauch & Hoffman
Attorneys

Patented July 6, 1937

2,086,425

UNITED STATES PATENT OFFICE 2,086,425

INTEGRATING APPARATUS

Garrett B. Linderman, Jr., Pittsburgh, Pa., assignor to Pittsburgh Equitable Meter Company, Pittsburgh, Pa., a corporation of Pennsylvania Application June 30, 1931, Serial No. 547,980
Renewed October 5, 1934

12 Claims. (Cl. 235—61)

This invention relates to integrating apparatus adapted particularly for use in integrating orifice meter charts although not limited to this use.

In measuring the flow of fluid through a conduit or pipe it is common practice to insert in the pipe line an orifice plate to create a differential of pressure on opposite sides thereof and to associate with said orifice plate, a mechanism whereby the differential in pressure on opposite sides of the orifice is recorded on a chart, and the static pressure is also recorded on the same chart. The graphic records thus produced are usually recorded upon a circular chart for a 24-hour period, and the quantity of fluid flowing in the pipe may be computed from the differential and static pressure curves.

In accordance with the known laws of the flow of fluids and gases, the rate of flow of the fluid or gas is equal to a constant multiplied by the square root of the product of the absolute static pressure and the differential pressure across the orifice. The constant entering this equation is variable in accordance with the type of fluid, the temperature thereof, the design of the particular orifice meter, and many other factors.

In computing the volume of fluid passed from the two recorded pressure curves, it has been common practice to measure with a scale the static pressure and differential pressure values at a plurality of short time intervals on a chart to be integrated, compute the product of the static and differential pressure at each of said intervals, manually, extract the square root of each of these products, multiply by the meter constant, and then to sum up the results. It will be readily understood that this method of calculating volume flow is slow and laborious, is subject to human error, and is most unsatisfactory since the time intervals selected may not truly represent the average volume flow.

The primary object of this invention therefore is to provide novel apparatus whereby laborious manual calculations are avoided and the volume flow is directly, rapidly, accurately and mechanically calculated and integrated from the static and differential pressure curves of orifice meter charts.

Another object of this invention is to provide a novel apparatus for mechanically integrating the square root of a value recorded on a chart.

Another object is the provision of a novel apparatus for mechanically multiplying the integrals of the square roots of a plurality of values recorded on a chart.

Another object of this invention is to provide a novel chart integrating and calculating apparatus having means to receive an orifice meter chart in association with tracing points for each of the curves on the chart, whereby the operator may manually follow the variations in the curves with the tracing points and the final result in volume of fluid will be accurately indicated upon a counter or indicator.

Still another object of this invention is to provide a calculator for orifice meter charts which is readily adaptable to accommodate charts having widely variant pressure ranges by a simple manual adjustment which may be made without dismantling or disassembling any parts of the machine.

Still a further object of this invention is to provide a novel start-stop mechanism for a calculator for orifice meter charts, wherein the indicating mechanism is so mechanically coordinated with the movements of the chart that the indicator starts and stops simultaneously with the movement of the chart. Another object is to provide a novel arrangement so that rotation of the chart and registering movement of the indicator are simultaneously stopped automatically after one revolution of the chart or any predetermined portion of a revolution so that a complete chart or any portion thereof may be measured with great accuracy.

Another object of this invention is to provide an improved driving mechanism for a calculator for orifice meter charts, wherein the use of gearing is greatly reduced and the vital portions of the machine where extreme accuracy of drive is necessary is accomplished by friction drives, thus insuring that small increments of movement are more accurately recorded than is possible with gears.

These and various other objects of the invention will be apparent from the following description and appended claims when taken in conjunction with the following drawings, wherein:

Fig. 9 is a broken detail showing the adjustable connection between the static of pen arm segment and the static pen arm.

Fig. 13 is an enlarged detail showing in side elevation the connection between the manually operated pen arms and their linkages.

Fig. 14 is a section showing the driving and stop mechanism for the chart platen.

Fig. 15 is a detail section on line 15—15 of Fig. 14.

Figures 1, 2, 10:
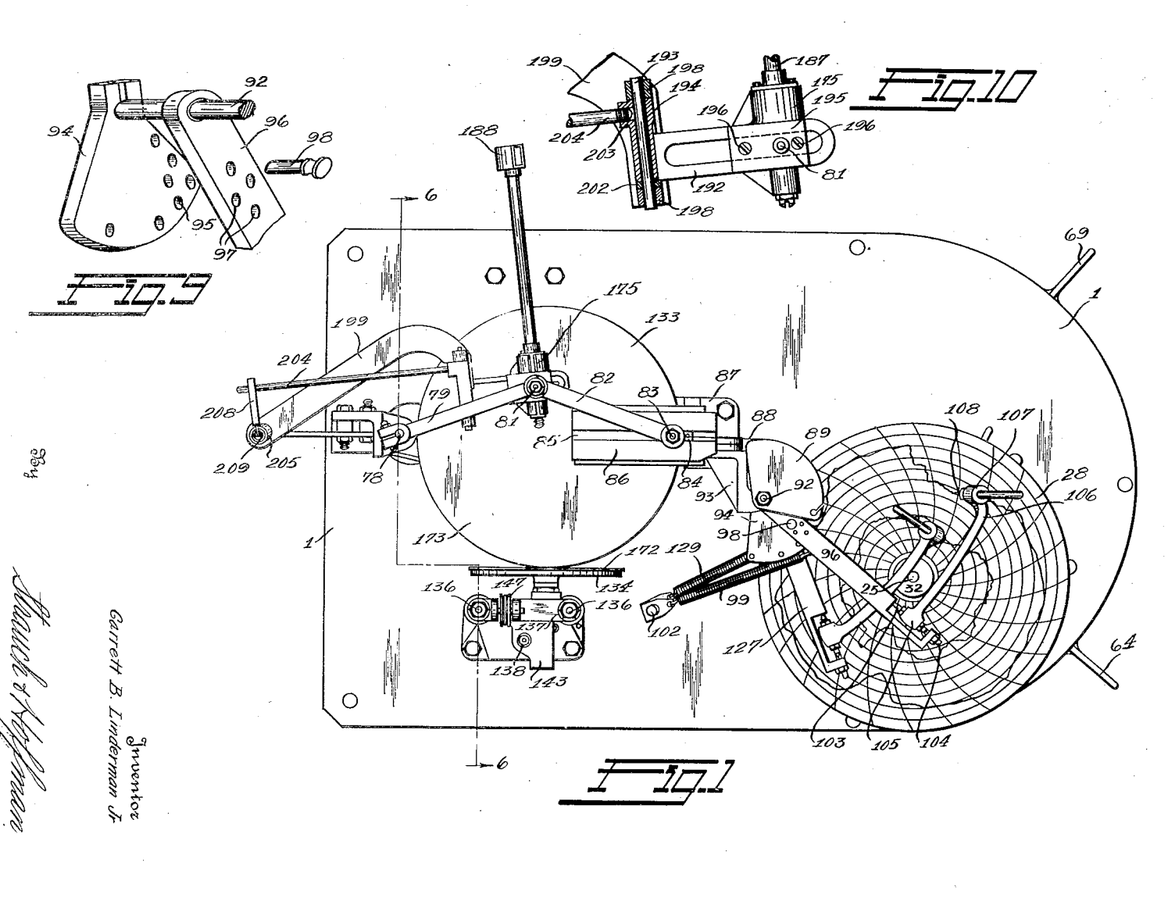
Fig. 1 is a top plan of a preferred embodiment of my invention with a chart in position for integration.
Fig. 2 is a side elevation of the complete machine shown in Fig. 1.
Fig. 10 is a plan view partly in section showing the mounting of the friction wheel housing.
Figure 2:
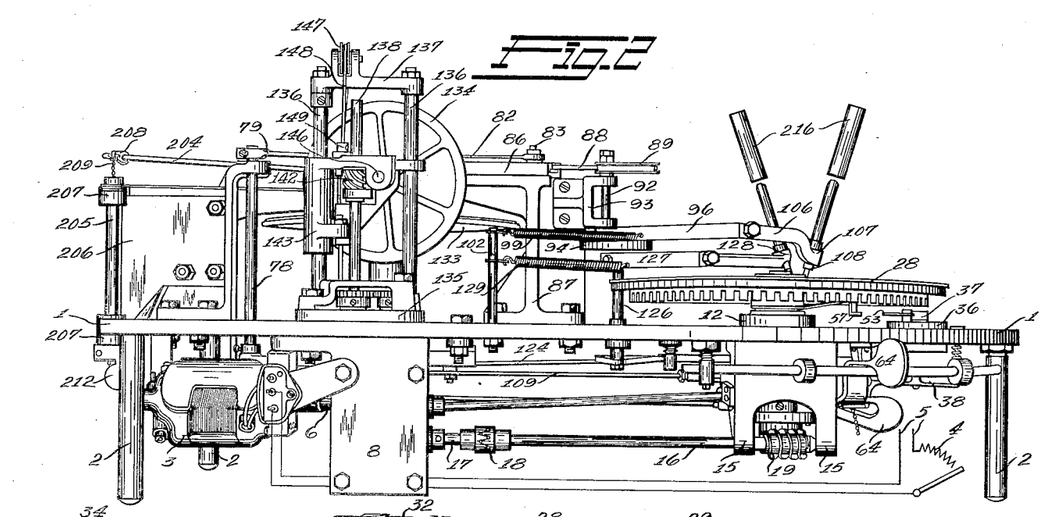

Referring to the drawings wherein like parts are designated by similar reference characters, the mechanism of the calculating machine is carried on opposite sides of a base plate 1, said base being adapted to be supported from a work table or bench by suitably positioned legs 2. Suitably carried beneath the base plate 1 by brackets is an electric motor 3 for driving certain moving parts of the calculator. As indicated in Fig. 2, the electric motor 3 is controlled by a foot operated rheostat controller 4, connected into the line 5. This controller may preferably be positioned on the floor adjacent the foot of the operator whereby initial pressure will close the circuit through the resistance and any desired speed of the motor may be obtained by pressure of the foot. As explained hereinafter in detail, the operator manually moves tracing points over the curves of a chart and where the curves are smooth and regular the motor may be speeded up but if the curves are angular and rapidly changing in their nature and pressure of the foot may be relieved to cause the motor to slow down due to the insertion of a greater resistance in the circuit. The motor shaft 6 passes into a gear box 7 also suspended beneath the base plate 1 by the bracket 8.

In order to clarify the description of this invention the various units thereof will be described in detail, each unit being given a heading in order that the description may be easily located.

*Chart support and driving means therefor*

The charts of orifice meters are usually circular and have two curves inscribed thereon, one curve representing the static pressure in the conduit with which the meter was associated, and the other curve representing the differential pressure on opposite sides of the orifice. This invention is described in connection with orifice meter charts, and is particularly designed for use therewith, but it will be understood that the calculator is not so limited since it may be used to integrate the square root of any quantity represented graphically or a product of any two quantities represented by curves.

Referring now to Fig. 14 the base plate 1 is provided with an opening adjacent the curved end thereof in which is positioned a hollow sleeve member 9 which also functions as a supporting bracket. The sleeve 9 is supported from the base plate 1 by a nut 12 and is further provided with shoulders adjacent the upper and lower portions thereof for supporting ball or roller bearings 13 and 14. The sleeve 9 is further provided with a pair of brackets 15 for providing a bearing support for driving shaft 16 which is connected to a corresponding shaft 17 (Figure 4) projecting from the gear box 7 and driven by the electric motor 3. A toothed clutch 18 connects shafts 16 and 17.

Figure 4:
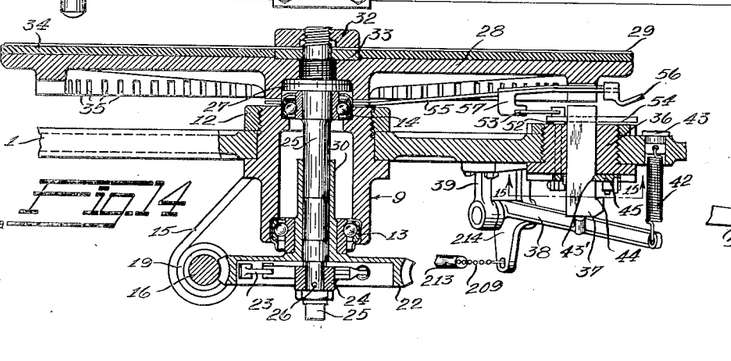
Fig. 4 is a perspective view of the bottom of the machine.

Between the two brackets 15 supporting the shaft 16 said shaft is provided with worm gear 19 which meshes with a corresponding gear 22. As seen in Figs. 4 and 14 the worm gear 22 is journalled in bearing 13 and is provided with a central recess or chamber in which is positioned an impositive or friction drive comprising two pivoted friction shoes or members 23 urged outwardly into engagement with the cylindrical wall of the recess in gear 22 by individual springs. Members 23 are pivoted to a collar 24 which is secured to a vertically extending shaft 25 by means of a tapered pin 26. The vertically extending shaft 25 projects upwardly through sleeve member 9, and is rotatably journalled at one end in sleeve 30 surrounding shaft 25 and also extending upwardly into sleeve 9. Shaft 25 has a nut secured to the lower end thereof below the collar 24. Gear 22 is supported by engagement with the collar 24 of the clutch and is maintained in proper alignment by its collar 30 surrounding shaft 25. Thus it will be seen that gear 22 is driven positively from shaft 16 through engagement with worm 19, and shaft 25 is frictionally or impositively driven from gear 22 by engagement therewith of friction shoes 23 secured to the shaft 25.

Shaft 25 has an outwardly extending flange 27 above the upper bearing 14 and also two threaded portions above said flange. The lower of these threaded portions is adapted to receive a chart carrying platen or disc 28 which is provided with a plane surface for the reception of a chart 29. The chart 29 is clamped against the face of the platen 28 by a threaded nut 32. The platen 28 is counter-bored adjacent the opening through which the shaft 25 projects to receive a washer 33 for cooperation with the nut 32. The upper surface of platen 28 has cemented thereto a rubber mat 34 which extends upwardly to be flush with the upper surface of washer 33. When it is desired to change chart 29, nut 32 is removed, the old chart taken off, and a new chart is slipped over the upper projecting end of shaft 25 to rest on the rubber mat 34, and is clamped in position by the nut 32. Nut 32 in conjunction with rubber mat 34 prevents slipping of the chart when once in position.

The platen 28 is provided with a downwardly projecting rim in which a multiplicity of accurately machined openings 35 are formed for the reception of a stop mechanism operating as follows. The base 1 is provided with a threaded opening to receive a collar 36 which has a rectangular opening for slidably receiving a stop member 37. The upper end of stop member 37 is positioned beneath the slots 35 of the platen 28 and is normally pressed upwardly into engagement therewith by a bell crank lever 38 pivoted on a bracket 39 and engaging the lower end of the stop member 37, said lever 38 having its free end secured to spring 42, the opposite end of which is secured to plug 43 in base 1. Stop member 37 has two shoulders 43' and 44 along one edge thereof which are adapted to be engaged by a reciprocating slide 45. Slide 45 is normally pressed to the left of Figure 14 by spring 46 (Fig. 15) engaged against pin 47 on the slide 45. Slide 45 is furthermore provided with a pin 48 to be engaged by an arm 49 secured to the lower end of the shaft 52 which passes upwardly through the collar 36 and has secured to its upper end two angular arranged levers 53 and 54.

The levers 53 and 54 are arranged to oscillate shaft 52 and arm 49 thereon to reciprocate the slide 45 to thus release stop member 37. One arm 53 is adapted to be engaged by the depending portion 57 of a start-stop lever 55 which is pivoted adjacent shaft 25 and extends outwardly beyond the rim of the platen 28 and engages in one of the slots 35. This member 55 has a finger piece 56 whereby it may be depressed. Lever 55 is normally positioned above the stop member 37, so that when it is depressed, a portion thereof will engage the upper end of stop member 37 to depress the same. The lever 54 is provided to manually release the slide 45 to stop the rotation of platen 28.

The operation of this portion of the invention is as follows: When a chart 29 has been positioned on the rubber mat 34 and the tracing points to be hereinafter described, are correctly positioned with respect to their curves, and the electric motor 3 is running at the desired speed, the hand lever 56 is depressed. This moves the loosely pivoted member 55 downwardly to engage the upper end of the stop member 37 and presses the same into the position shown in Fig. 14, where it is latched by slide 45. The member 55 does not leave the notch 35 with which it is engaged, but rotates with platen 28. When this platen is thus released the friction clutch members 23 at once cause rotation of shaft 25, carrying the platen 28 and the chart 29 therewith. When the parts have made one complete revolution, the depending portion 57 of member 55 will engage the projecting end of lever 53 to thus oscillate shaft 52, causing arm 49 to rotate slightly in a clockwise sense as viewed in Fig. 15, to thus reciprocate slide 45 and release the stop 37. Stop 37 at once rises due to spring 42 to engage a notch 35 of the platen 28 to stop rotation thereof, and of shaft 25, and because of the friction drive between gear 22 and shaft 25 the motor and driving parts are not instantly stopped. As usually constructed, the orifice meter charts are so arranged that a complete revolution thereof corresponds to 24 hours of use. If for any reason it is desired to integrate a smaller portion of the chart, such as four hours, the stop member is released, the lever 55 is moved back sixteen notches 35, each notch corresponding to one-quarter hour, and the tracing points are positioned to begin the portion to be integrated. When the tracing points reach the end of the desired period, the lever 54 will have returned to zero position and will oscillate shaft 52 and stop the mechanism by reciprocation of slide 45 by way of lever 49 and pin 48.

*Static pressure pen mechanism*

Referring to Fig. 4, it will be seen that one end of the base plate 1 is curved and a guide rail 62 is secured on the lower face thereof adjacent the curved end. Guide rail 62 has slidably mounted thereon stops 63 that may be adjusted and secured in position by thumb screws, not shown. Each stop member 63 cooperates with manually operated levers 64 and 69 for operating the static and differential pressure pens or tracing points, respectively. Member 64 is curved to clear the mechanism which drives the platen 28 and is pivoted on a shaft 65 depending from the base plate 1. The inner end of member 64 is provided with an extended hub around which is adjustably clamped a member 66 having an integral arm 67 extending therefrom, for the reception of a clevice 68. Similarly the differential operating member 69 has adjustably secured to its central sleeve or collar a member 72 which is clamped thereto, member 72 having a lever 73 to which a clevice 74 is attached. It will thus be seen that the manually operated members 64 and 69 may be freely oscillated within the limits provided by their respective stops 63 and oscillations thereof will oscillate clevices 68 and 74 to reciprocate the tie rods connected thereto. The tie rod 75 of the static pressure member 64 is connected at its opposite end to a clevice 76 pivoted to lever 77.

This lever 77 has a split sleeve or collar at its opposite end and is rigidly clamped around a shaft 78 which extends upwardly through an opening in the base plate 1. As seen in Figures 1 and 2, the upper end of shaft 78 has clamped thereto the split end of a lever 79. Lever 79 is swiveled on a pin 81 which also has swiveled thereto the end of an arm 82. The opposite end of arm 82 is pivoted to a pin 83 carried by a sliding block 84 adapted to reciprocate in the groove 85 of guide block 86. Guide block 86 is carried by bracket 87 secured to the upper surface of the base plate 1, as seen in Figure 2.

Slide 84 has secured thereto a thin flexible steel tape 88 which extends around and is secured to a segmental member 89 secured to a shaft 92 carried by auxiliary bracket 93 secured to bracket 87. At its lower end shaft 92 has secured thereto a segment 94, having a plurality of openings 95 therein. Loosely pivoted on shaft 92 above the segment 94 is a static pen arm 96 having a series of openings 97 therein, for the reception of a pin 98, whereby the segment 94 and the pen arm 96 may be rigidly secured together for simultaneous oscillation. Openings 95 and 97 arranged in the segment 94 and pen arm 96 are so arranged that certain ones of said openings may be aligned for the reception of the pin 98. As indicated in Fig. 9, these openings are arranged at varying distances from the shaft 92 and are also arranged at varying angular distances around said shaft as a center. By this arrangement the pin 98 may be withdrawn, the pen arm moved to a position wherein another pair of holes align, and the pin 98 dropped therein. It is frequently desirable to be able to accommodate on the same calculating machine charts having widely variant pressure ranges and the novel selective connecting mechanism above described accomplishes this purpose. The pen arm 96 thus may be arranged at varying angular distances with respect to the segment which oscillates it to accommodate varying charts without disassembling or replacing any parts.

The static pen arm 96 is normally biased toward zero position on the chart with which it cooperates by spring 99 secured at one end to the pen arm 96 and at the other end to a shaft 102 projecting upwardly from the base plate 1.

From Fig. 1, it will be seen that the static pen arm 96 is adapted for oscillation over the chart carrying member 28. The pen arm 96 is recessed adjacent its outer end, and positioned within this recess is the pen arm fulcrum pin 103 having conical shaped ends for engagement with a conical bearing in the pen arm 96 in one end and in a bearing screw 104 at the other end, said bearing screw being threaded to the end of the arm 96 and secured in position by a lock nut. Threaded on the fulcrum pin 103 are two nuts which position the collar 105 of the pen arm 106 on fulcrum pin 103. Pen arm 106 is provided with a sleeve 107 at its outer end for the reception of a pen or a tracing point 108. Tracing point 108 is for the purpose of following one curve on the chart with which the calculating machine is associated and is preferably although not necessarily, a marking element such as a fountain pen provided with colored ink for leaving a tracing mark on the chart. Thus in operating the machine the operator thereof may at once ascertain wherein he has not accurately followed the curve on the chart, and may at once compensate for such inaccuracy, moving the pen 108 an equal distance on the opposite side of the curve.

Operation of the static pressure pen

As the chart carrying platen 28 is revolved as previously described, the operator may move the static pen operating arm 64 which will move the lever 67 and by the connecting lever 77 and tie rod 75 will oscillate shaft 78. Oscillation of shaft 78 will cause oscillation of the lever 79 thus causing pin 81 (see Fig. 1) to move radially with respect to a friction disk 133 as described more fully hereinafter. This movement of pin 81 causes movement of link 82 and reciprocates the slide 84 within a slot 85, thus causing the tape 88 to oscillate the segment 89 and shaft 92, thus imparting similar oscillation to segment 94 and pen arm 96 and pen 108. Thus the pen 108 may be manually guided to follow the curve on the chart. The pin 81 will assume varying radial positions in accordance with variations of the curve being traced.

Differential pressure operating mechanism

Figures 7, 8:
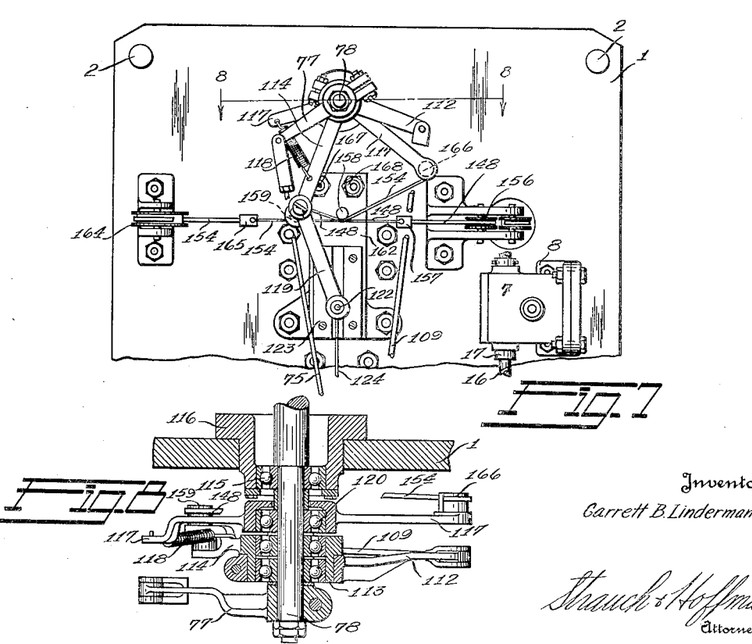
Fig. 8 is a section taken substantially on line 8—8 of Fig. 7.

The connecting mechanism whereby the differential pen may similarly trace the differential curve on the chart resembles to some extent the above described mechanism for the static pressure pen. As previously indicated, the differential lever 69 which projects beyond the edge of the chart carrying base plate 1, may be oscillated to cause oscillation of the individual clevis member 74. Clevis 74 is connected to link 109, the opposite end which is pivoted to a differential fulcrum pin lever 112, which is swiveled about vertical shaft 78 and is rigidly but adjustably secured to the hub 113 of the differential fulcrum link 114 as seen in Fig. 8. Both of these links have ball bearings interposed between their hubs and the shaft 78. Thus the links 112 and 114 oscillate together but are free of the shaft 78.

As seen clearly in Fig. 8, the shaft 78 is supported from a ball bearing 115 carried by a bracket 116 which projects through an opening in the base plate 1. Freely carried on the shaft 78 for oscillation with respect thereto is a differential tension link 117 having a ball bearing support 120 therefor. This tension link 117, has two oppositely extending arms arranged at an angle to one another, one of said arms being connected to the differential operating lever 114 by a spring 118. As seen in Fig. 8 the link 114 is provided with a cleviced end, one side thereof being connected to a tape 148 and the other being connected to a link 119 as hereinafter more fully described. Spring 118 tends to rotate the freely pivoted tension link 117 in a counterclockwise direction as viewed in Fig. 4.

The clevice end of lever 114 is pivoted to a connecting link 119 whose opposite end is pivoted to a slide 122 which may reciprocate in a slide block 123. Said slide block has connected thereto a steel tape 124 whose opposite end is connected to a segment 125 rigidly secured to a vertically extending shaft 126. Shaft 126 projects upwardly through a bushing carried by the base plate 1 and is positioned approximately in vertical alignment with shaft 92. Shaft 126 has fixedly secured thereto the differential pen arm 127 which extends out over the platen 28 and has a pen 128 mounted in the end thereof similar to the mounting of the static pressure pen 108.

From the description as given it will be apparent that movement of the differential operating lever 69 will cause reciprocation of tie rod 109 to thus oscillate the differential lever 112 and thus similarly oscillate the lever 114. Link 119 will reciprocate the slide block 122 and the differential tape 124 will pull the segment 125, thus oscillating the shaft 126 and carrying the differential pen 128 over the chart. The operator may thus follow the variations in the differential curve with the differential pen 128. Spring 129 tends to return the differential lever and pen arm to zero position.

From the above description it will be clear that the static pressure and differential pens may be manually moved to follow their respective curves, and the pens thereof will make characteristic markings on the chart to indicate where the operator did not accurately follow the curves. The pen 128 for the differential curve will preferably have a different colored ink than the static pen 108 whereby their respective marks may be easily followed on the chart. The mutual effect of the following of variations of the static and pressure differential curves in order to operate an indicator which will designate the square root of the product of the quantities represented by these curves will now be described.

Differential friction disc drive

Figures 3, 11, 12:
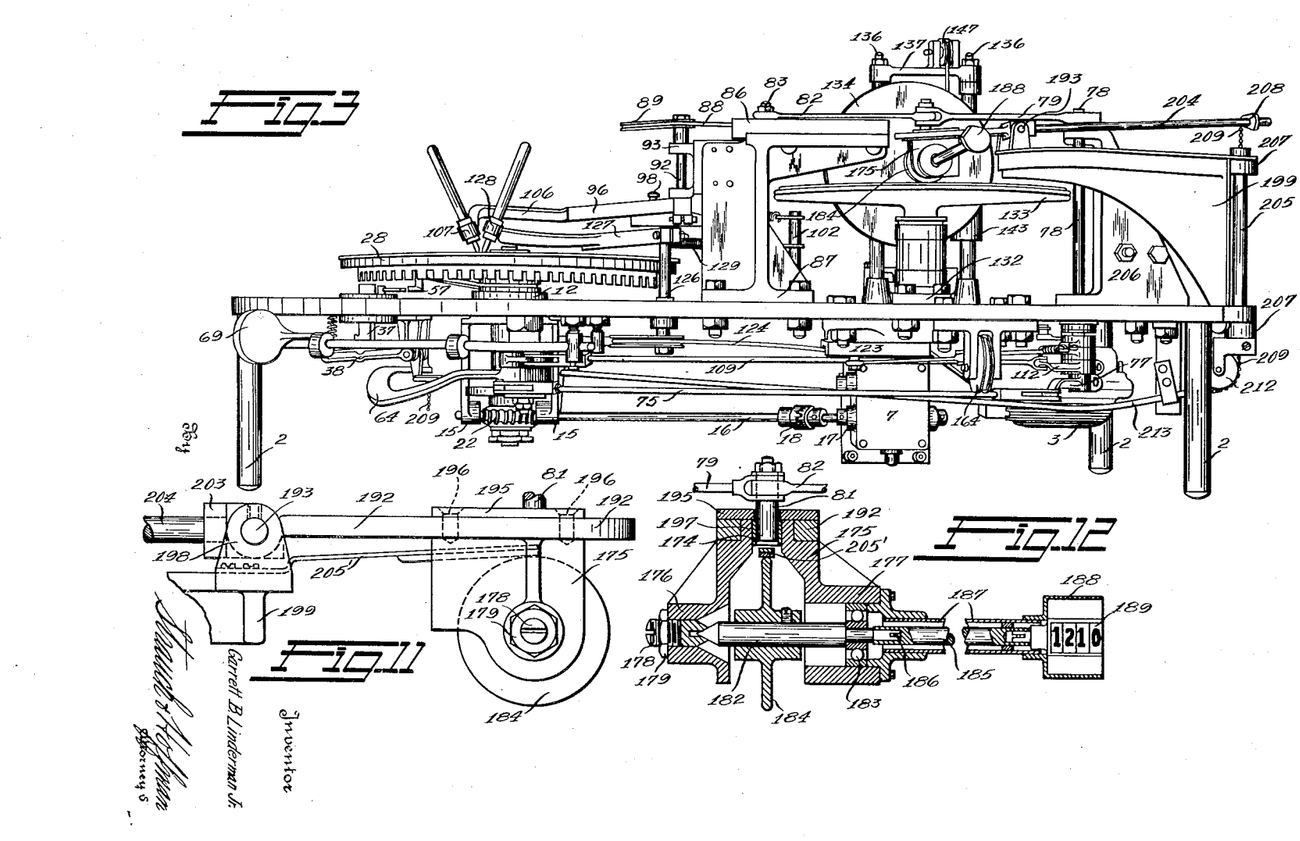
Fig. 3 is another side elevation looking from the opposite side of Fig. 1.
Fig. 11 is an enlarged side elevation of the parts shown in Fig. 10.
Fig. 12 is a sectional view showing the mounting of the friction wheel in its bracket.
Figure 6:
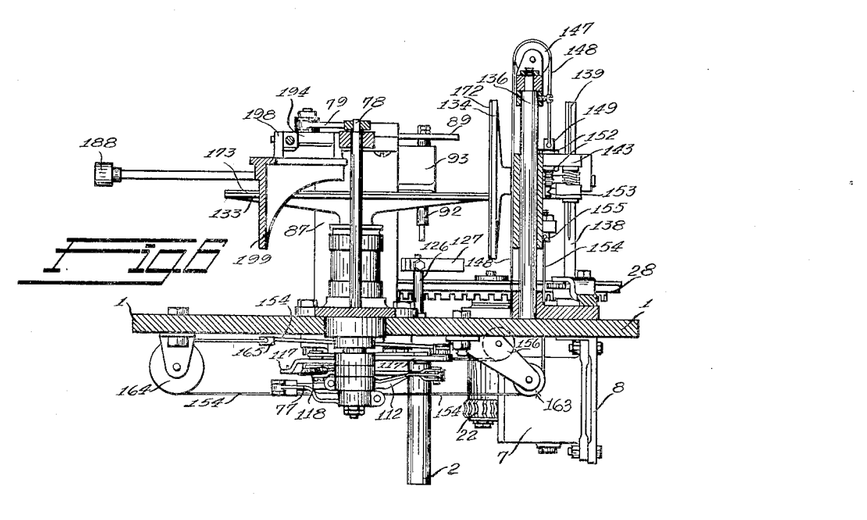
Fig. 6 is a section substantially along line 6—6 of Fig. 1.

Referring now to Figures 2 and 3, it will be seen that a bracket 132 is mounted on the upper surface of the base plate 1 for pivotally supporting a driven friction member or disc 133. This disc 133 is freely rotatable in a plane which is parallel to and spaced above the base plate 1. The rim of the driven disc 133 is in frictional engagement with a driving frictional disc or prime mover 134 positioned in a plane at right angles to disc 133, and the relative position of the driven disc 133 and frictional disc or wheel 134 is varied in accordance with the variations of one of the curves on the chart as will hereinafter appear. Driving disc or member 134 is mounted for reciprocation vertically to vary the speed of the driven disc 133 in accordance with the variations in the differential pressure curve by the following mechanism. Referring to Fig. 2 the base plate 1 has a bracket 135 mounted on the upper surface thereof carrying two upright guide shafts 136 connected at their upper ends by a bracket member 137. A driving shaft 138 positioned between the two guide shafts 136 extends vertically through an opening in the base plate 1 into the gear box 7 and is adapted to be rotated by suitable gearing in said gear box. Shaft 138 is provided with an elongated keyway 139 as seen in Fig. 6 whereby a worm gear 142 may be driven by said shaft and the elongated keyway allows relative reciprocation of the shaft and gear.

Figure 5:
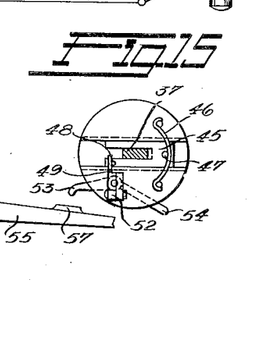
Fig. 5 is an end elevation thereof.

Mounted for reciprocation on guide shafts 136 is a bracket 143, the gear 142 being retained between shoulders on the bracket as seen in Fig. 2. Gear 142 meshes with gear 144 as seen in Fig. 5, secured to a horizontal shaft 146 to which the driven friction disc or gear 134 is secured. It will be clear therefore that shaft 138 and worm gear 142 are constantly rotating as long as the motor is running and the bracket 143 may be reciprocated vertically, carrying with it the gear 142, the cross shaft 146, and the driven friction disc 134. Therefore the speed of rotation of the driven disc 133 will be varied in accordance with the vertical position of the bracket 143 and the driving disc 134. The bracket 143 is vertically positioned in accordance with the variations in the differential curve as follows.

The bracket 137 secured to the shafts 136 carries a pivot for supporting idling pulley 147 engaged by a steel tape 148. One end of tape 148 is secured to the bracket 143 by an adjustable pin 149. As seen in Fig. 6, pin 149 is adjustably mounted with respect to bracket 143 by two locknuts 152, the lower end of pin 149 having an opening 153 into which a pin may be inserted to hold the member 149 against rotation while the locknuts 152 are adjusted to adjust the height of driving disc 134 on the tape so that the center of the driving disc will contact the driven disc when the link mechanism is in a straight line or zero position.

Tape 148 extends downwardly through suitable openings in the base plate 1 and is operated by the differential lever mechanism. Another tape 154 is secured to a threaded pin 155 also mounted in the bracket 143.

Figures 4, 7:
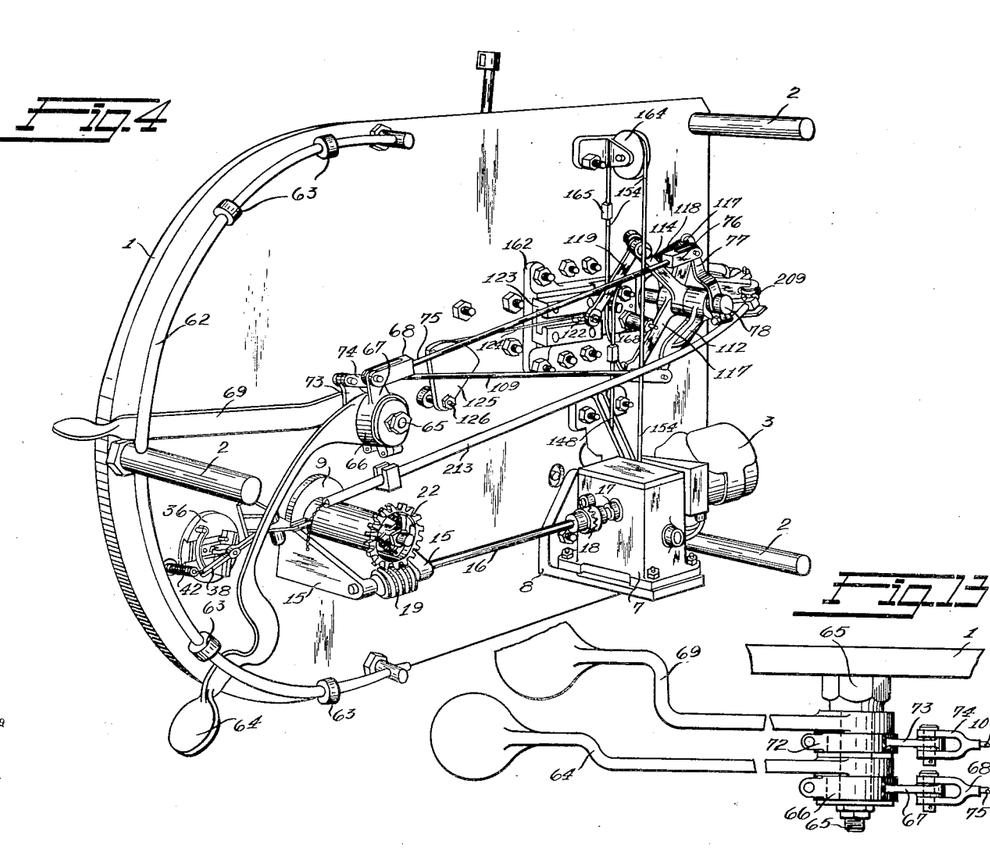
Fig. 7 is a bottom view of the parts shown in Fig. 6.

The tape 148 after passing below the base plate 1 is guided over a pulley 156 mounted on a suitable bracket and extends across base plate 1 and is connected to a connector block 157 as seen in Fig. 7. A continuation of the tape 148 then passes around a guide pin 158 located in alignment with shaft 78 and guide 123 and at a distance from shaft 78 equal to the distance of connecting pin 159 therefrom, and is secured to a connecting pin 159 mounted on the upper half of the clevice on the end of differential fulcrum link 114. As seen in Fig. 7, the guide pin 158 is mounted on the bracket 162 which carries the slotted guide block 123. The other steel tape 154 passes downwardly through the base plate 1 and over a pulley 163 and extends completely across the base plate 1 and around a pulley 164 mounted on the lower face of base plate 1. Tape 154 is further connected to a connector block 165 and then passes around the guide pin 158 to a pin 166 on the end of one arm of the doubled armed tension lever 117. This lever 117 acts as a tension link for the tape, since the spring 118 is normally under tension.

Lever 114 is provided with a stop pin 167 for cooperative engagement with a rotatably adjustable cam 168. Cam 168 is mounted on the bracket 162 and by loosening the locknut on the end of the shaft to which it is mounted, the cam may be adjustably rotated to any desired position. The pin 167 and the cam 168 act as a stop when the differential pen 128 is at zero position on the chart and the linkage mechanism is in a straight line. Thus oversetting of the parts is prevented.

By the system of levers and linkages as above described in combination with the tape, it will be apparent that the bracket 143 and the driving friction disc 134 assume a vertical position in accordance with the varying positions assumed by the differential pen as the pen follows a differential curve on a chart. Since the differential lever 112 is positively moved by the hand lever 69 in following the differential curve, the differential fulcrum lever 114 also is constrained to move simultaneously, since lever 114 is rigidly connected to lever 112. Since the tape 148 is connected to pin 159 on lever 114 which is the knee of the toggle formed by levers 114 and 119, it will be clear that the tape 148 will be positively pulled in one direction; and since tape 148 and 154 form one continuous flexible member, the ends of which are connected to the vertically movable bracket 143, it will be clear that this bracket will be positively moved. The rectilinear distance between pin 159 and pin 158 is proportional to the square root of the travel of pin 122, as will be pointed out hereinafter, so that the movement of disc 134 likewise is proportional to the square root of the radial distance traveled by the differential stylus. The opposite end of the tape is secured to the tension link 117, whereby movement in the opposite direction causes movement of the tape 148 and 154. Due to spring 118 the tension link 117 will follow the movement of differential link 114 to thereby maintain the spring under proper tension at all times and to move the vertically movable bracket 143 in the opposite direction.

It will thus be seen that the driving disc 134 will be moved vertically to vary the speed of the driven disc 133. In order that there may be no slippage between this drive, the vertical disc 134 and the horizontal disc 133 are provided with rubber facings 172 and 173 respectively.

*Indicator mechanism*

It will be recalled that the two links 79 and 82 seen more clearly in Fig. 1, constitute in effect a toggle link wherein the pin 81 moves in accordance with the static pressures indicated on the chart. This pin 81 is adapted to move a friction wheel radially with respect to the driven disc 133 and said friction wheel drives an indicator for thereby indicating the volume of gas as recorded on the orifice meter chart.

Referring now to Figs. 11 and 12, the pin 81 projects downwardly into a bushing 174 carried in the upper end of a friction wheel housing 175. Housing 175 is open at its lower end and has two oppositely extending collars 176 and 177, collar 176 being threaded to receive a bearing screw 178 having a conical recess in the inner end thereof and retained in position by locknut 179. A friction wheel shaft 182 is supported at one end by the bearing screw 178 and at its opposite end by a ball bearing 183 supported in the sleeve 177. Shaft 182 has secured thereto a friction wheel 184, which projects downwardly out of the open end of the housing 175. Shaft 182 projects beyond the ball bearing 183 and is adapted to engage an indicator shaft 185 preferably by a sliding fit, wherein shaft 185 telescopes over shaft 182, and the two shafts being retained together by a locking pin 186. The indicator drive shaft 185 is retained within a tubular housing 187, secured to the end of sleeve 177 and having at its opposite end a casing 188. Casing 188 has an opening in one side wall thereof through which the indicator dials 189 are visible, such dials being driven from shaft 185 by suitable gearing in known manner.

The friction wheel housing 175 is supported from a slotted bracket 192 which is pivoted on a cross shaft 193. As seen more clearly in Fig. 10, the slotted bracket 192 is secured to a tubular support 194 which projects to one side thereof. The friction wheel housing 175 is held in adjustable position with relation to the bracket 192 by a plate 195 connected to the upper surface of housing 175 by threaded bolts 196. Housing 175 has a rectangular boss 197 projecting into the slot of bracket 192 to which boss the plate 195 is secured. Due to the fact that boss 197 has a snug fit within the slotted bracket 192, the housing 175 is prevented from rotation with respect to its bracket support 192. Sleeve member 194 to which slotted bracket 192 is secured is positioned between two upstanding lugs 198 of a pivoted bracket 199 through which lugs the pivot shaft 193 extends. A guide spacing bar 202 is positioned between one end of sleeve 194 and one of the upstanding lugs 198. By reversing the position of the spacing bar 202, the bracket 192 and friction wheel housing 175 may be adjustably positioned with respect to the supporting bracket 199. Furthermore the friction wheel housing 175 is free to adjust itself with respect to its bracket 192 due to the free sliding fit of the plate 195.

The sleeve member 194 is provided with a threaded lug 203 projecting from the opposite side to which the bracket 192 is secured, said lug being adapted for the reception of a threaded rod 204. A flat spring 205', secured to stationary bracket 199 extends outwardly through the open side of housing 175 and into engagement with the upper rim of friction wheel 184 when the wheel is lifted off disc 133. This spring serves as a brake to prevent overrunning of the friction wheel as hereinafter fully described.

Bracket 199 which supports the entire assembly just described including the wheel housing, the friction wheel and the indicating mechanism associated therewith, extends outwardly beyond the back of the base plate 1 as seen in Fig. 1 and is pivoted at tubular shaft 205. Tubular shaft 205 is supported from the base plate 1 by a vertically extending bracket 206 having bearings 207 adjacent the upper and lower ends of member 205.

As seen in Figures 1 and 3, the friction wheel is normally in engagement with the driven disc 133. By the pivoted support for bracket 199 and the slidable relation of boss 197, which carries pin 81, with bracket 192 carried thereby as above described, it will be apparent that the friction wheel 184 may move about the shaft 78 as a center in accordance with movements of the static pressure pen, and although the pin 81 moves in an arcuate path with the arm 79 as a radius, (according to the geometrical proof hereinafter referred to) the support of friction wheel 184 maintains the plane thereof at all times at right angles to the radii of the friction disc 133. Hence, it will be seen that the distance between centers of pin 81 and shaft 205 always is a chord of the circle in which the friction wheel 184 travels, and the distance between centers of pin 81 and disc 133 likewise is a chord of the same circle, the diameter of which is defined by the distance between centers of disc 133 and shaft 205. The indicator 189 is therefore driven by friction wheel 184 at a speed in accordance with the radial position of the friction wheel 184 with respect to disc 133, and it will be geometrically proven hereinafter that the distance of friction wheel 184 from the center of disc 133 is proportional to the square root of the distance of pen 108 from the center of the chart.

*Automatic control of friction wheel*

One feature of this invention is the provision of automatic mechanism wherein the friction wheel is raised and lowered into and out of contact with the driven disc 133 in accordance with the stopping and starting of the chart platen 28. To accomplish this result, the rod 204 has an arm 208 secured thereto at one end and said arm is connected to a flexible member such as chain 209 which extends downwardly through tubular shaft 205, thence over a suitable pulley 212 (see Fig. 3), thence through a protecting tube 213 and is secured to the depending arm 214 of the bell crank 38 (see Fig. 14). It will be recalled that the bell crank 38 operates in conjunction with the stop 37 which prevents rotation of the chart platen 28. The operation of this feature of the invention is as follows. Normally when the chart platen is stationary, the stop 37 is moved upwardly by spring 42 which thus allows the bell crank 38 and the arm 214 to move counterclockwise as seen in Fig. 14. This movement of connected chain 209 is transmitted to rod 204 which rocks bracket 194 about its shaft 193, thus raising the entire friction wheel assembly and disconnecting the wheel from the driven disc 133. After the chart has been placed in position and the motor has been started thus driving the two discs 133 and 134, the operator may position the static and pressure pens at the starting point of the curves to be integrated. At this time although the discs 133 and 134 are rotating, no indication is being made on the indicator mechanism 189 since the friction wheel is out of contact with the disc and spring 205' is in engagement with the friction wheel. The operator now depresses the start lever 56 thus pressing the stop 37 out of engagement with the teeth 35 and the platen 28 starts rotation due to friction clutch members 23. Simultaneously with this operation the tension of chain 209 is relieved and the friction wheel assembly will at once oscillate so that the friction wheel 184 engages disc 133 and is free of brake spring 205'. This oscillating movement is due to the weight of the friction wheel mechanism and the indicator mechanism. As soon as the selected parts of the curves have been integrated, the stop mechanism 37 moves upwardly the friction wheel is simultaneously disengaged from disc 133.

By this mechanism it will be seen that the indication as registered by the friction wheel will be extremely accurate. The brake spring 205' prevents overrunning of the wheel so that rotation thereof ceases as soon as the same is disconnected from the disc.

As seen in Figure 2, the tracing pens 108 and 128 are adapted to receive an enclosing cap member 216 which is adapted to be easily removed and replaced for protecting the ink receiving portions of the pens.

Figure 16:
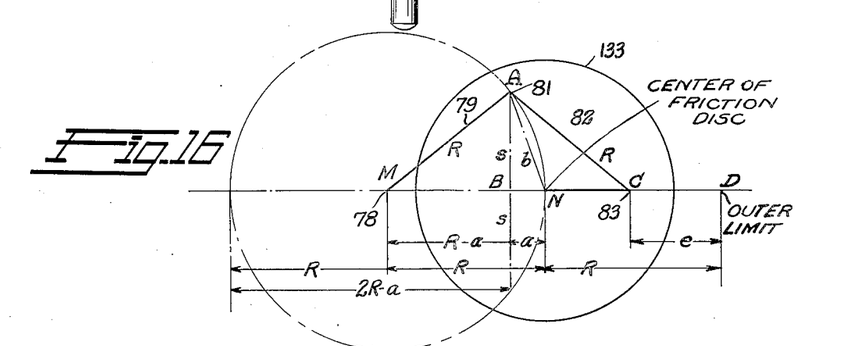
Figs. 16 and 17 are diagrammatic views illustrating the trigonometric relation of the parts.
Figure 17:
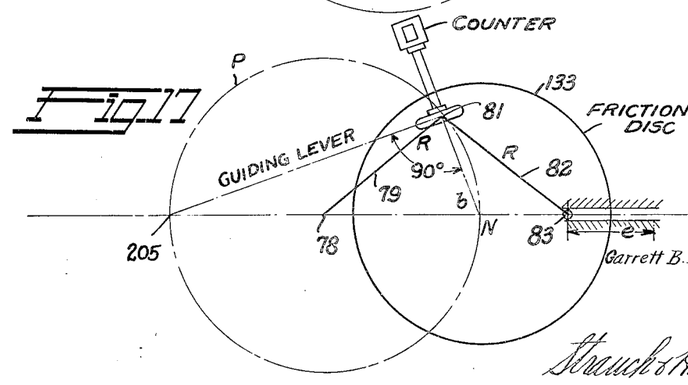

From the preceding description it is believed that the mechanical operations of the parts as thus far described will be clear. The friction wheel 184 will take a radial position in accordance with the static pressure curve being traced and the speed of the driven disc 133 with which it engages will be varied in accordance with the vertical position of the driving disc 184 which is varied in accordance with the differential pressure curve. Reference will now be had to Figs. 16 and 17 for the theory of operation.

Referring now to Figure 17, the friction wheel 184 is shown at any position in its path which is arbitrarily selected. It will be seen that the pin 81 of the friction wheel moves about the point 78 as a center and the friction wheel 184 is guided in its movement by guide lever 199 about the axis 205. The center N of disc 133 and the point 205 define the diameter of the circle P described by pin 81 in its movement, and therefore the arbitrary radius $b$, passing from the center N of disc 133 through the center of pin 81, and guiding lever 199 are chords of the same circle P. From the geometrical theorem that two chords drawn from the extremities of the diameter of a circle to a common point in the circumference will form a right angle at the meeting point, it follows that the plane of friction wheel 184 is always at a right angle to a radius $b$ passing through the center of pin 81, or stated differently, the axis of friction wheel 184 is always coincident with a radius $b$.

Referring now to Figure 16, the travel of pin 83 carried by slide 84 is designated by the reference letter "e" and the equal arms 79 and 82 are designated R. The distance DM is twice the radius R. A chord $s$ is dropped from point A perpendicular to the diameter N—205 of circle P and will be bisected thereby. From these known dimensions the following equations may be deduced.

$\triangle ABC$ is congruent to $\triangle ABM$

Because $$s=s;\ AC=AM=R$$
$$<CBA=<ABM=90°$$

Therefore:

$$CB=BM=R-a$$

Since $DM=2R$, we obtain:

(1) $\quad DC=2R-MC=2R-(CB+BM)=2R-2(R-a)$ (2) $\quad$ or $DC=2a=e$

Where $e$ is the travel of point C. When two chords cross in a circle then the product of the parts of each chord are equal.
Therefore:

(3) $\quad s \times s = a \times (2R-a)$ (4) $\quad s^2 = 2Ra - a^2$

According to the Pythagorean proposition, the square described upon the hypothenuse of a right angle triangle is equal to the sum of the squares described upon the other two sides.
Therefore:

$$b^2 = s^2 + a^2$$

or (5) $\quad a^2 = b^2 - s^2 \quad (\triangle NBA)$

Equation (5) in Equation (4) we obtain:

(6) $\quad s^2 = 2Ra - (b^2 - s^2)$ or $$s^2 = 2Ra - b^2 + s^2$$

(7) $\quad b^2 = 2Ra$

From Equation (2)

(8) $\quad a = \dfrac{e}{2}$ substituted in Equation (7) we obtain $$b^2 = 2R \times \dfrac{e}{2}$$

(9) $\quad b^2 = Re$ or $$b = \sqrt{R} \times \sqrt{e}$$

or (10) $\quad b = C\sqrt{e}$, where $C = \sqrt{R}$

In words: The travel "b" of the friction wheel is proportional to the square root of the travel "e" of point "C":

Therefore, the indication as registered on the indicator associated with the friction wheel will be proportional to the square root of the displacement of the static pressure pen. Since the static pressure pen is adapted to follow the static pressure curve, it will be seen that the indicator will register proportional to the square root of the static pressure as indicated by the curve being integrated.

By the use of similar equations, it can be demonstrated that the vertical movement of the driving friction disc 184 is likewise proportional to the square root of the displacement of the slide 122 from its zero position. For these equations the vertical movement of friction disc 184 would correspond to the letter "b" Fig. 16 and the displacement of the slide 122 would correspond to the letter "e". Therefore driven disc 133 is rotated at a speed proportional to the square root of the differential pressure as indicated by the differential pressure curve on the chart being integrated.

Since the friction wheel 184 is driven directly by the driven disc 133, it will be apparent that the friction disc will therefore rotate at a speed proportional to the product of the two determining factors, namely the static pressure and the differential pressure. Since the parts are so arranged that this speed is proportional to the square root of these two factors, it will be obvious that the indicator will therefore record the volume of fluid as recorded on the chart in accordance with the equation $$Q = c\sqrt{P_s . P_d}$$

where Q is the quantity or volume, $P_s$ is the integral of static pressure, $P_d$ is the integral of differential pressure and $c$ is a constant for the orifice meter.

The present invention has been specifically described for use in connection with orifice meter charts for obtaining the volume of flow. Obviously the invention is not so limited, since the calculating machine may be used for obtaining the square root of the product of any two quantities as represented by curves.

There are in common use several types of orifice meters for measuring the volume flow of fluids. Each of these types of orifice meters has individual characteristics, whereby the curves produced have individual characteristics. By providing suitable adjustments for the centers of the various links and changing their lengths by relatively simple adjustments, and the use of simple attachments the present machine may be adapted to integrate charts of the various types of orifice meters.

Another feature of this invention which renders the operation of the machine extremely simple is the fact that the chart may be placed on the chart disc in any relative position and the integration thereof may start from any desired position. If the integration is to be 24 hours, the chart will make one complete revolution. If a shorter time interval is desired, the hand operated stop mechanism including the lever 54 may be set back the desired number of quarter hour notches and the integration will be automatically stopped when the mechanism returns to zero.

It will be understood that the volume of flow of fluid as indicated on this machine may be read direct in cubic feet, for example, by properly designing the parts to take into account the constant of any particular orifice meter. If the machine is to be used for various types of orifice meters by adjustments of the centers, then a table will be furnished for each type of meter showing the differential pressure ranges along one side and the static pressure ranges along the other side whereby the constant for the particular meter under specific conditions of use may be obtained. When the reading of the integrator machine is multiplied by this particular constant, the actual flow of gas will be obtained. These factors or constants may be readily determined by measuring charts with known curves on the integrator and dividing the known quantity into the integrator reading as obtained.

Although the machine as herein described appears complicated, nevertheless its operation is relatively simple whereby unskilled workers may use the same. The operator need only be instructed in the way to place the chart on the machine, how to follow the two curves on the chart with the respective tracing points, and how to start and stop the machine by the foot controller and the hand stop.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. A calculating machine for integrating the square root of the product of two quantities represented by curves comprising a member adapted to receive a chart having two curves thereon, a constantly rotating disc, a driven disc, said discs being in frictional engagement with the rim of the driven disc engaging the face of the constantly rotating disc, means for moving the constantly rotating disc in accordance with variations of one curve to thereby vary the speed of the driven disc, a friction wheel engageable with said driven disc, means for varying the relative position of the friction wheel relative to said driven disc in accordance with variations of the other curve to thereby vary the speed of said friction wheel, and means to disengage the friction wheel and the driven disc.

2. In a chart integrator, a driving disc, a driven disc having its edge frictionally engaged with the face of said driving disc, a friction wheel engaging the face of said driven disc, an oscillatable arm for varying the radial position of said friction wheel with respect to said driven disc, a link pivotally connected to said friction wheel at one end, and means for guiding the other end of said link on a radius of said driven disc.

3. The invention as defined in claim 2 wherein said driving disc is movable parallel to the axis of said driven disc to vary the speed of said driven disc by means including a pair of links pivoted together at one end, one end of one link being pivotally mounted and one end of the other link being guided in a straight line.

4. A calculating mechanism for meter charts comprising a rotary platen adapted to receive a chart having curves thereon to be integrated; a pair of arms carrying tracing members designed to independently follow the curves on the chart; a driving disc operable in synchronism with said platen; a driven disc; one of said discs having its periphery engaging the surface of the other disc; means for axially moving the driving disc in accordance with the movement of one of said tracing members; a friction wheel in operating contact with said driven disc; and means for moving said friction wheel toward and away from the periphery of said driven disc in accordance with the movement of the other of said tracing members.

5. In a calculating apparatus for meter charts, a rotatable disc and a friction wheel held in peripheral engagement therewith; a pivoted arm carrying said wheel; and a second arm pivoted at said wheel at one end and guided diametrically opposite the pivot of said first arm for movement along the diameter of said disc.

6. In a calculating mechanism for meter charts, a carrier adapted to receive a chart having a curve thereon to be integrated, a rotating driving member operating in synchronism with said carrier, a second rotating member frictionally driven thereby, the ratio of drive therebetween being variable, an arm oscillatable about a fixed pivot, a link pivotally secured adjacent one end to said arm the other end of said link being constrained to move in a rectilinear path projecting through said fixed pivot, said projected path being taken as a reference line, means for transmitting motion from said constrained end to a stylus for tracing over a curve on said chart, a flexible connection between said link pivot and said driving member for radially varying the driving engagement of said driving and driven members in accordance with the rectilinear distance between the link pivot connection and its position in said reference line, and means for manually oscillating said arm.

7. In a calculating mechanism for meter charts, a carrier adapted to receive a chart having a curve thereon to be integrated, a rotating driving member moving in synchronism with said carrier, a second rotating member frictionally driven thereby, the ratio of drive therebetween being variable, an arm oscillatable about a fixed pivot, a link pivotally secured adjacent one end to said arm and having its other end constrained to move in a rectilinear path projecting through said fixed pivot, said projected path being taken as a reference line, a flexible connector for transmitting motion from said constrained end to a pivotally mounted stylus for tracing over a curve on said chart, means for radially varying the driving engagement of said driving member relative to said driven member in accordance with the distance between the link pivot connection and the position of said link pivot connection in said reference line, and means for manually oscillating said arm.

8. In a calculating machine for meter charts, a carrier adapted to receive a chart having a curve thereon to be integrated, a rotating member moving in predetermined relation to said carrier, an arm oscillatable about a fixed pivot, a link pivotally secured adjacent one end to said arm, the other end of said link being constrained to move in a rectilinear path projecting through said fixed pivot and the center of said rotating member, a wheel secured at the pivotal connection of said arm and link in peripheral contact with said rotating member, means for manually oscillating said arm, means for transmitting motion from the constrained end of said link to a stylus for tracing over a curve on said chart, said wheel being moved in varying radial relation with said rotating member in accordance with the movement of said stylus.

9. In a calculating machine for meter charts, a carrier adapted to receive a chart having a plurality of curves thereon to be integrated, a rotating driving member moving in synchronism with said carrier, a second rotating member frictionally driven thereby, a stylus for tracing a curve on said chart, means for moving said stylus manually to trace the curve including means connecting said driving member with said stylus whereby the radial relation of said one member to the other is varied in proportion to the square root of the movement of said stylus, an arm oscillatable about a fixed pivot, a link pivotally secured adjacent one end to said arm and having its other end constrained to move in a rectilinear path projecting through said fixed pivot and the center of said second member, a counterwheel secured at the pivotal connection of said arm and link in peripheral contact with said second member, means for manually oscillating said arm, means for transmitting motion from the constrained end of said link to a second stylus for tracing a second curve on said chart, said counter wheel being capable of movement in varying radial relation with said second member.

10. In a calculating machine for charts indicating volumes of flow passing through a meter at variable pressures; a driven disc; a friction wheel operatively associated with said disc; means for moving said friction wheel in the plane of said disc; and means for maintaining the axis of said friction wheel coincident with radii of said disc comprising a pivoted link slidably guiding said fricton wheel.

11. In a calculating machine, a tracing point oscillatable over a chart to follow a curve thereon, an indicator, a friction wheel connected to said indicator, a driven disc, means for guiding said friction wheel in an arcuate path in engagement with said disc, and a motion transmitting connection between said tracing point and said friction wheel for moving said tracing point in accordance with the movement of said wheel.

12. In a calculating machine, a tracing point oscillatable over a chart to follow a curve thereon, an indicator, a friction wheel connected to said indicator, a driven disc, means for guiding said friction wheel in engagement with said disc in an arcuate path passing through the center of said disc, and means guided in a lineal path on a radius of the disc and connected to said wheel for moving said tracing point in accordance with movement of said wheel.

G. B. LINDERMAN, Jr.